United States Patent [19]

Laxo

[11] 4,443,029
[45] Apr. 17, 1984

[54] TUBULAR CLAMP ASSEMBLY

[75] Inventor: Darryl E. Laxo, Novato, Calif.

[73] Assignee: Chevron Research Company, San Francisco, Calif.

[21] Appl. No.: 347,114

[22] Filed: Feb. 8, 1982

[51] Int. Cl.³ .............................................. F16L 35/00
[52] U.S. Cl. ....................................... 285/93; 285/367
[58] Field of Search ................. 285/367, 410, 93, 366, 285/365

[56] References Cited

U.S. PATENT DOCUMENTS

| | | | |
|---|---|---|---|
| 2,878,041 | 3/1959 | Hobbs | 285/367 |
| 3,498,649 | 3/1970 | Pfeuffer | 285/93 X |
| 4,093,283 | 6/1978 | Weinhold | 285/365 X |
| 4,185,858 | 1/1980 | Peash | 285/367 |

FOREIGN PATENT DOCUMENTS

| | | | |
|---|---|---|---|
| 780240 | 3/1968 | Canada | 285/367 |
| 30180 | 6/1981 | European Pat. Off. | 285/367 |
| 681997 | 2/1965 | Italy | 285/366 |

*Primary Examiner*—Dave W. Arola
*Attorney, Agent, or Firm*—D. A. Newell; E. J. Keeling; R. H. Evans

[57] ABSTRACT

A coupling unit is provided for joining flanged pipe ends. The ends are held in a pair of semicircular clamp members having inclined recesses and wedge elements for separating the flanges apart and bringing them into contact with the clamp.

5 Claims, 2 Drawing Figures

U.S. Patent   Apr. 17, 1984   4,443,029
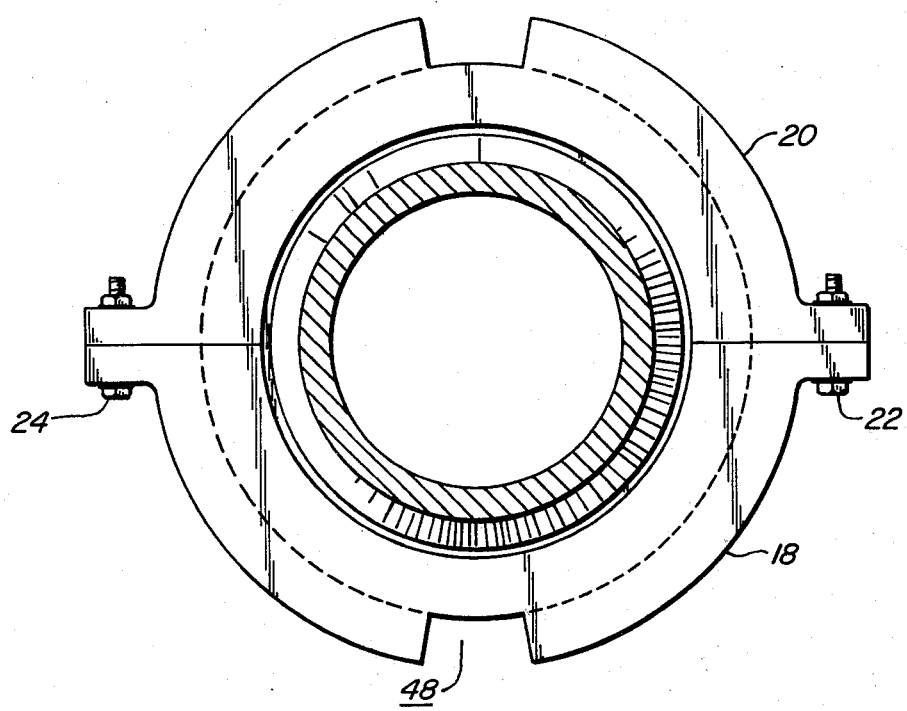
FIG._1.
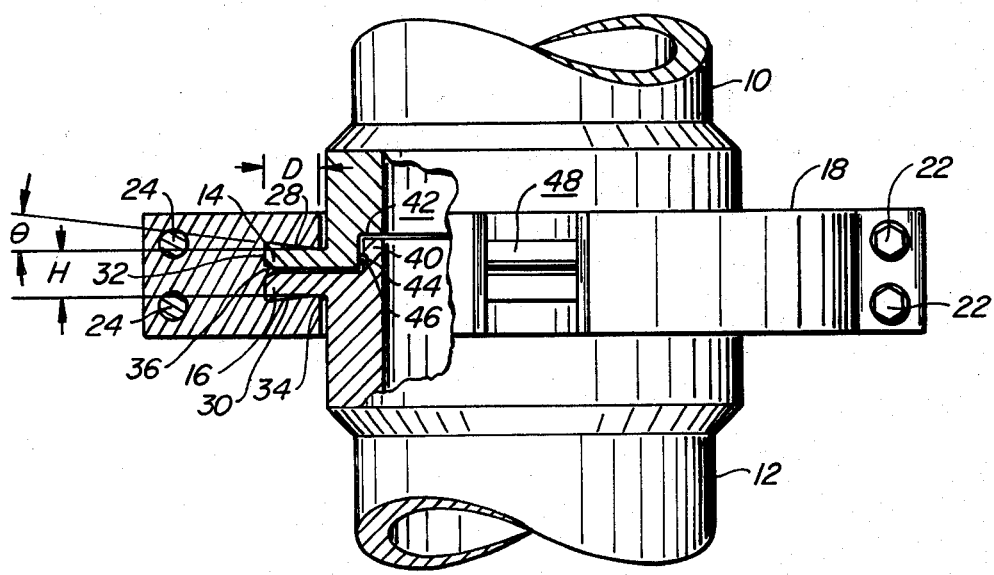
FIG._2.

TUBULAR CLAMP ASSEMBLY

FIELD OF THE INVENTION

This invention relates generally to a coupling assembly for flanged tubing or pipe ends. It is particularly useful for joining pipe segments used as tendon elements in tension leg platforms.

BACKGROUND OF THE INVENTION

A variety of tube assembly clamps are known in the art for joining flanged tubing ends in sealable abutment. In a conventional design assembly, the flange rim is shaped to converge outwardly towards the flange face. The clamp, having a complementary shaped recess, is tightened around the abutting flanges, usually with nut-and-bolt pairs, such that the inwardly radially directed forces from the clamp are translated into axial forces by the inclined surface of the flanges to forceably seal the pipe ends in an abutting relationship.

Such devices are adequate for pipes which are under little or no tensile strain. However, in piping systems under tensile loads, the resulting radial forces tending to push the clamps away from the flanges require counterbalancing by overly large bolts. In addition, the holding bolts are subjected to cycle loading and fatigue failure.

With the dwindling supplies of oil and gas, offshore drilling operations in deeper and deeper waters are becoming commonplace. The tension leg platform offshore drilling and producing structure is designed for water depths which are uneconomical for fixed platforms. With such structures, a buoyant platform is anchored to the sea floor through tendons extending from the platform to the ocean bottom. The structure is given excess buoyancy and the tendons remain under a tensile load to counterbalance the excess. Connected pipe segments may be, and are preferentially used to form the tendons. Tendon axial load varies with wind, wave and current conditions and strong joints are required to withstand such cyclic loading.

In the present invention, a method and means of coupling flanged pipe ends are provided which minimizes the coupling assembly expense and the radially directed stresses on the coupling resulting from tensile axial loads.

SUMMARY OF THE INVENTION

The present invention relates to a coupling unit for joining two pipe ends, the end of each pipe having a flange which extends radially outward therefrom. The outer surface of each flange (the surface opposite the face) inclines toward the flange face in the direction of the pipe axis. The system requires a pair of semicircular clamp members, each member having a recess therein for receiving the pipe flanges. The radially extending surfaces of the clamp members which form the recesses are inclined to converge inwardly toward the pipe axis and have a minimum separation approximately equal to the maximum combined thickness of the abutting flanges. A wedge element is associated with the clamp member at the base of the recess to spread the flanges apart into complementary contact with the inclined recess surfaces. Sealing may be obtained by one or more flexible gaskets on a protrusion of one pipe inserted in a recess of the other pipe.

Preferably, the clamp members have apertures therein for inspection of at least a portion of the outer flange spacing.

BRIEF DESCRIPTION OF THE DRAWINGS

FIG. 1. Top elevation, partly in cross section, of apparatus suitable for use in the invention.

FIG. 2. Side elevation, partly in cross section, of apparatus of FIG. 1.

DETAILED DESCRIPTION OF THE PREFERRED EMBODIMENT

The present invention can best be understood by referring to the drawings which show the coupling between two pipes 10 and 12. While the invention is described primarily in relationship to the particular embodiment shown, it should be understood that the description is not intended to limit the invention to those particular details. Rather, the invention is intended to cover other embodiments, modifications and equivalents as are included within the spirit and scope of the invention defined by the appended claims, and reference is made to the particular embodiment herein only to facilitate description of the invention.

Referring again to FIGS. 1 and 2, there is shown, respectively, top and side views, partly in cross section, of a coupling between two pipes. Pipe 10 has an outwardly extending flange 14 at the end thereof and pipe 12 has a similar flange 16. The outer surface of each flange inclines toward the flange face in the direction of the pipe axis. The pipe ends are held in their depicted relationship by means of two semicircular clamp members 18 and 20. Clamp elements 18 and 20 are preferably held in place by nut-and-bolt pairs 22 and 24. Each clamp member has a recess therein for receiving the pipe flanges. The recesses are formed by radially extending walls or surfaces 28 and 30 of the clamp members and an axially aligned recess base wall 32.

The radially extending recess walls 28 and 30 converge inwardly towards the pipe axis to a minimum separation which is substantially equal to the combined height, H, of the outer radial edge of the abutted flange elements 14 and 16. The depth, D, of the recess will normally be somewhat less than the flange extension to prevent engagement of the clamp elements against the flange-to-pipe fillet 34. Wedge element 36 situated at the recess base wall 32 separates the flanges 14 and 16 into complementary contact with the angled recess walls 28 and 30.

The magnitude of angle theta ($\theta$) will be dependent upon the material and geometry of the pipe, flange, and clamp. Proper design would have angle theta ($\theta$) greater than or equal to zero at the maximum anticipated load condition.

The use of two pairs of nut-and-bolt units permits the individual nut-and-bolt pairs to be removed for inspection and replacement if required without decoupling of the pipe ends.

Preferably, pipe 12 has an axially extending male projection 40 and pipe 10 has a complementary female recess 42 for receiving projection element 40 whenever the pipe ends are joined.

One or more circumferential grooves 44 may be machined in male projection 40 for the receipt of one or more flexible gaskets, such as O-rings 46 to accomplish sealing between pipes 10 and 12.

In addition, each semicircular clamp member may be provided with an aperture 48 for inspection of the flange separation without decoupling.

From the above description, it is readily seen that tensile loads will be principally carried by the clamp body proper rather than the clamp bolts. As the clamp bodies are more massive than the bolts, loading is more easily handled than with conventional coupling assemblies without requiring massive nut-and-bolt units.

I claim:

1. A coupling unit for joining two pipe ends, which comprises: flanges extending radially outward from each end, the outer flange surfaces inclining towards the flange faces in the direction of the pipe axis;

at least a pair of semicircular clamp members, each member having a recess therein defined by a base portion and radially extending surfaces for receiving the pipe flanges, the radially extending surfaces of said clamp members forming said recesses being inclined to converge inwardly toward the pipe axis, and said surfaces having a minimum separation approximately equal to the maximum combined thickness of the abutting flanges;

said clamp members having wedge element means associated with the clamp members at the base of the recess inclining coacting with said outer flange surfaces for separating the flanges into direct complementary contact with the inclined radially extending surfaces of the clamp members forming the recess when in clamped position and means for holding said clamp members in clamped position.

2. A coupling assembly as recited in claim 1, wherein at least one of said clamp members has an aperture therein for inspection of a portion of the outer pipe flange spacing.

3. A coupling assembly as recited in claim 1, wherein one of said pipe ends has an axially extending projection for insertion into a complementary axially extending recess formed in the other pipe end.

4. A coupling assembly as recited in claim 3, wherein said axially extending projection is circumferentially grooved to accommodate a flexible O-ring to insure sealing between said pipe ends in abutment.

5. A coupling assembly as recited in claim 1, 2 or 3, wherein said means for holding said pair of clamp members in clamping position around the pipe flanges includes at least two nut-and-bolt units at the member ends.

* * * * *

UNITED STATES PATENT AND TRADEMARK OFFICE
CERTIFICATE OF CORRECTION

PATENT NO. : 4,443,029
DATED : April 17, 1984
INVENTOR(S) : Darryl E. Laxo

It is certified that error appears in the above-identified patent and that said Letters Patent are hereby corrected as shown below:

Col. 4, Line 01, after recess, --inclining coacting with said outer flange--, should read "coacting with said inclining outer flange surfaces".

Signed and Sealed this

Nineteenth Day of February 1985

[SEAL]

Attest:

DONALD J. QUIGG

Attesting Officer                    Acting Commissioner of Patents and Trademarks